United States Patent Office 3,549,594
Patented Dec. 22, 1970

3,549,594
SOLID STATE POLYMERIZATION OF TETRACARBOXYLIC ACIDS DIANHYDRIDES AND AROMATIC TETRAMINES
Ian C. Twilley, Petersburg, and Stanley D. Lazarus, Chester, Va., assignors to Allied Chemical Corporation, New York, N.Y., a corporation of New York
No Drawing. Continuation of application Ser. No. 546,617, May 2, 1966. This application Oct. 1, 1969, Ser. No. 862,977
Int. Cl. C08g 20/32, 33/02
U.S. Cl. 260—47
9 Claims

ABSTRACT OF THE DISCLOSURE

Thermally stable polymers having exceptionally high melting points with average molecular weights ranging up to about 100,000 are prepared by polymerizing an aromatic tetramino compound with an aromatic dianhydride at temperatures ranging up to about 350° C. until a completely condensed linear polymer is obtained which may be characterized as having heterocyclic fused rings as recurring units in the polymeric chain.

---

This application is a continuation of applicants' copending application S.N. 546,617 filed May 2, 1966 and now abandoned.

This invention is directed to a new and useful class of high molecular weight linear aromatic polymers having outstanding thermal stability. More specifically, this invention relates to aromatic polymers having high melting points with average molecular weights ranging up to about 100,000 and to the process of preparing said polymers for a variety of uses. Still more specifically, this invention is directed to thermally-stable polymers prepared by polymerizing an aromatic tetramino compound with an aromatic dianhydride at temperatures ranging up to about 350° C. until a completely condensed linear polymer is obtained which may be characterized as having heterocyclic fused rings as recurring units in the polymeric chain.

Presently, there are known and available in the art a number of aromatic polymers capable of withstanding temperatures in excess of about 400° C. Most of these polymers, however, have been specifically tailored for use at elevated temperatures in response to demands of industry and government. For example, the aromatic copolyamides and polyamide-heterocyclic copolymers have been found to be particularly useful in preparing fire-protective clothing, tire cord, insulation materials and the like. In addition, fibers obtained from these particular polymers have been shown to have good properties even at temperatures approaching 500° C. The importance of temperature stability of a polymer is underscored when consideration is given to the various applications to which the polymer may be applied, Thus, for example, there is a great demand for polymeric materials which can be used to prepare protective clothing, and various other heat-resistant articles particularly for the military and aerospace programs.

It is generally recognized that the most promising organic polymetrs have ring structures in the polymeric chain which are believed to account for the increased stability at higher temperatures. The heterocyclic rings which may contain nitrogen, oxygen or sulphur have been noted to perform better, for example, than the related aromatic carbocyclic rings. This in indicated by comparing, for example, the aromatic copolyamides with the amide-hetercyclic copolymers wherein fibers of the latter were found to have improved tensile strength at increased temperatures in comparison to the all-carbon ring copolyamides. However, although the aromatic heterocyclic copolymers may be an improvement, in a number of respects, over the all-carbon ring copolyamides, none of these polymers are completely satisfactory with respect to their effectiveness to withstand high temperatures, intense radiation, acid or alkali exposure, oxidation degradation, etc., and, therefore, are substantially limited in their ultimate use.

Presently, high temperature fibers are being prepared from various polymers including, for example, the polyphenylene triazoles, polybenzimidazoles, polyamides, aromatic polyoxidiazoles, aromatic polythiadiazoles, copolyamides, heterocyclic copolymers, etc. While a number of these polymers have proven to be comparatively effective in preparing heat-stable articles, it has been found that in accordance with this invention certain aromatic polymers having at least six fused rings in the recurring unit can be prepared without difficulty to provide a variety of stable products. These products have been shown to be capable of exhibiting outstanding stability when exposed to radiation and elevated temperatures and, therefore, are particularly useful for the aerospace industry.

Accordingly, it is an object of this invention to provide aromatic linear polymers having at least six fused rings in the recurring unit which are substantially resistant to elevated temperatures and atomic radiation.

It is another object of this invention to provide thermally-stable aromatic linear polymers capable of being formed into fibers having high tensile strengths at elevated temperatures.

It is still another object of this invention to provide aromatic linear polymers having an average molecular weight ranging up to about 100,000 which are characterized as having high thermal stability and capable of being used for preparing heat-stable fibers, coatings and molded or extruded articles.

It is still another object of this invention to provide aromatic linear polymers having excellent resistance to thermal and oxidative degradation at temperatures ranging up to about 700° C.

It is still a further object of this invention to provide a process of preparing thermally-stable high molecular weight aromatic polymers capable of being used for preparing heat-stable fibers, coatings and various molded or extruded articles by conventional techniques.

These and other objects of the invention will become apparent from a further and more detailed description as follows:

The linear high molecular weight aromatic polymers of this invention are prepared by condensing at least one aromatic dianhydride or the corresponding tetra-acids or tetra-esters with aromatic ortho-tetramino compounds and the orthoisomers thereof in an inert atmosphere at a temperature ranging up to about 350° C. or higher. These polymers have molecular weights ranging from about 10,000 to 100,000 and preferably ranging from 20,000 to 50,000. More specifically, the tenaceous, thermal-stable aromatic polymers of this invention may be prepared in two stages by condensing at least one aromatic dianhydride, e.g., pyromellitic dianhydride, with at least one aromatic ortho-tetramino compound, e.g., tetraminobenzene, in the absence of oxygen, at temperatures ranging from about 100°–200° C. and more preferably from about 125°–170° C. to obtain imide-amine prepolymers. The prepolymers are heated then to temperatures ranging up to about 350° C. or higher over a period of at least about three hours until a completely condensed linear aromatic polymer is obtained. It is essential that the aromatic dianhydrides tetra-acids or tetra-esters and the tetramino compounds be present during the condensation polymerization in amount of approximately equal molar ratios.

The condensation polymerization of the aromatic tetramines and dianhydrides takes place at temperatures ranging from about 100°–350° C. in the absence of oxygen or in the presence of an inert atmosphere for periods ranging from 3 to 20 hours or more. More preferably, the reactants may be condensed at temperatures ranging from about 125°–270° C. in the presence of an inert gas, e.g., nitrogen, for periods ranging from about 3 to 6 hours. The use of nitrogen as the inert atmosphere not only acts to continuously remove any volatile constituents from the reaction vessel but also excludes oxygen which has been found to deleteriously affect the polymerization. Thus, while it may be possible to carry out the polymerization in a vacuum, it is obviously more desirable, from a practical standpoint, to carry out the polymerization in the presence of an inert gas.

In addition to solid state polymerization, the condensation may take place between the tetramines and dianhydrides in the presence of an organic solvent, e.g., dimethylformamide, at about room temperature or above to obtain the prepolymer. At the lower temperatures, the imide-amine prepolymers may be considered as being only partially condensed and are soluble in a number of organic solvents including, for example, the formamides, acetamides, formic acid, sulfoxides, sulfones, either alone or in combination.

As indicated, the condensation involves the polymerization of the aromatic tetramino compounds, e.g., tetraminobenzene, with the aromatic dianhydrides, e.g., pyromellitic dianhydride, at temperatures ranging up to about 200° C. to form the imide-amine prepolymers which when heated to temperatures ranging up to about 350° C. forms the completely condensed aromatic polymer.

These polymers may be illustrated by the following equation:

I.

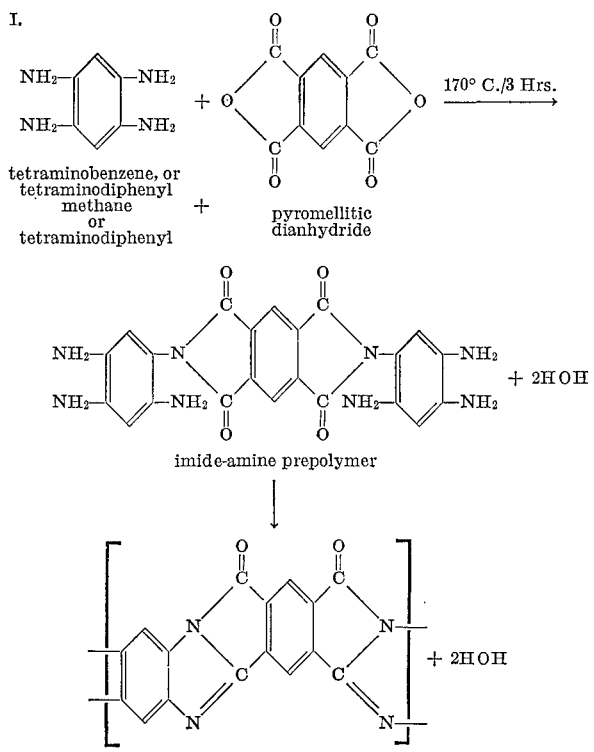

In addition to tetraminobenzene, for example, other aromatic tetramino compounds such as tetramino diphenyl methane, tetraminodiphenyl ethane and tetraminodiphenyl ether may be condensed with other aromatic dianhydrides or the corresponding tetra-acids and tetra-esters to obtain thermally-stable linear polymers having aromatic groups interconnected by fused rings as illustrated by the following formulae:

II.

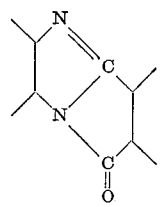

and

III.

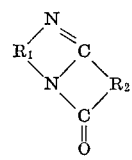

The polymers may be represented as consisting of recurring units of the above formula wherein —$R_1$— is an aromatic nucleus, e.g., a benzene ring, symmetrically tetra-substituted with nitrogen atoms forming the ring paired with the adjacent carbon atoms of —$R_2$—. The —$R_2$— radical may be characterized as an aromatic or a substituted aromatic group and will depend upon the particular dianhydride, tetra-acid or tetra-ester used in the initial reaction. Thus, for example, the tetra-acids or tetra-esters, particularly the tetra-phenyl esters, may be used in which case instead of splitting off water, an alcohol or phenol will be split off depending upon the particular tetra-ester used.

The aromatic tetramino compounds may be characterized as having aromatic nuclei which are joined either through a carbon-to-carbon bond or through simple linking groups including, for example, ether linkages, methylene groups or other similar small groups. For example, the aromatic tetramino compounds may have non-reactive groups attached to one aromatic nucleus which may be either a single ring or a fused ring system. The tetramino compounds include those wherein there is one ortho diamino reactive center on each of two rings including, for example, 3,4,3',4'-tetraminodiphenyl ether, 3,4,3',4'-tetraminodiphenylmethane, etc. It is possible also that the above-mentioned aromatic tetramino compounds may be substituted further with other small, non-reactive substituents on the aromatic nuclei which may include, for example, methyl, ethyl or a lower alkoxy group, such as a methoxy or an ethoxy substituent, and similar small non-reacting substituents which are incapable of reacting under conditions of condensation with amino or anhydride groups.

In addition to tetraminobenzene, other preferred tetramino compounds include, for example, tetraminodiphenyl ethane and tetraminodiphenyl ether. When these compounds are used in the polymerization, the recurring units of the polymer differ from the tetraminobenzene only by the presence of the methylene bridge between the phenyl groups or the ether oxygen as illustrated by the following formulae:

IV.

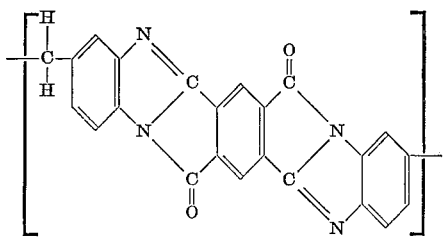

V. 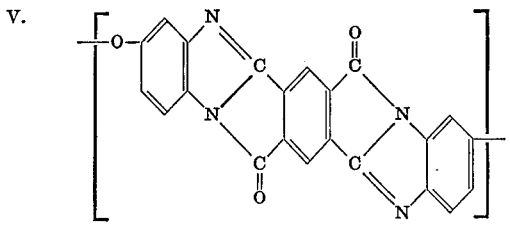

The tetracarboxylic acid dianhydrides used for this invention may be characterized by the formula:

VI. 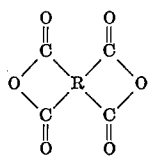

wherein R is a tetravalent aromatic radical. The preferred dianhydrides include compounds where R has at least six carbon atoms characterized by a benzoid unsaturation wherein the four carbonyl groups of the dianhydride are each attached to separate carbon atoms and wherein the carbon atoms of each pair of the carbonyl groups are attached directly to adjacent carbon atoms in a six-membered benzoid ring of the R group to provide a five-membered ring. The compounds may include, for example, pyromellitic dianhydride, 2,3,6,7-naphthalene tetracarboxylic dianhydride, 1,2,3,4,-butane tetracarboxylic dianhydride, 3,3',4,4'-diphenyl tetracarboxylic dianhydride, 1,2,5,6-naphthalene tetracarboxylic dianhydride, 2,2-bis (3,4,-dicarboxyphenyl) propane dianhydride, 2,2',3,3'-diphenyl tetracarboxylic dianhydride, bis(3,4-dicarboxylic phenyl) ether dianhydride, 1,1-bis(2,3-dicarboxyphenyl) ethane dianhydride, 2,2-bis(2,3-dicarboxyphenyl) propane dianhydride, bis(2,3-dicarboxyphenyl) methane dianhydride, bis(3,4-dicarboxyphenyl) methane dianhydride and mixtures thereof.

The following examples are specific illustrations of the method employed in preparing the thermal-stable polymers in accordance with this invention:

EXAMPLE 1

Approximately 4.36 parts by weight of pyromellitic dianhydride and about 4.48 parts by weight of tetramino diphenylmethane were mixed and placed in a reaction vessel and purged with nitrogen. The reaction mixture was heated to a temperature of about 125° C. over a period of about 15 minutes at which point water was flashed off. The reaction was continued with the temperature being increased to approximately 155° C. over a period of about 1½ to 2 hours at which temperature additional water was given off. The reaction was continued for an additional hour and the temperature was increased to about 170° C. At this point there was no formation of water and the color of the reaction product turned brown.

The reaction product was further heated for about another hour to a temperature of about 208° C. with additional water coming off. The temperature was increased from 208° C. to about 270° C. for an additional 7½ hours and then lowered to about 100° C. and held at this temperature over a weekend. The product was subsequently washed in a sodium bicarbonate solution, alcohol and finally in water. The final reaction product was rusty in color and found to have a melting point above 500° C. The polymer was found to be completely insoluble in solvents such as metacresol, formic acid, dimethylformamide and sulfuric acid. The above example was repeated except that tetraminobenzene was used in place of the tetraminodiphenyl methane and similar results were obtained.

The recurring unit of the polymerized product of 3,3',4,4'-tetraminodiphenyl methane and pyromellitic dianhydride was calculated to have a molecular weight of approximately 374.4 wherein the carbon was theoretically calculated as 73.79, hydrogen as 2.69 and nitrogen as 14.97. Chemical analysis of the polymer obtained from Example 1, in comparison to the theoretical calculations, showed the recurring unit of the polymer to have on an average approximately 71.51% carbon, 5.25% hydrogen and 15.04% nitrogen as shown in the following table.

TABLE I

| Polymer Sample (Example 1) | Percent C | Percent H | Percent N |
| --- | --- | --- | --- |
| 1 | 71.47 | 5.48 | 15.00 |
| 2 | 71.88 | 5.08 | 15.58 |
| 3 | 71.17 | 5.19 | 14.55 |
| Average | 71.51 | 5.25 | 15.04 |

A comparison of the analytical data obtained from the polymer with the theoretical data shows that the desired product of high purity was obtained, and that the higher percentage of hydrogen was attributed to the absorption of moisture by the sample.

As indicated, the condensation reaction may take place with or with the presence of an organic solvent such as dimethylformamide at room temperatures. At these lower temperatures, the imide-amine prepolymers are completely soluble in many organic solvents and may be used at this stage for preparing polymeric coatings. The coated surfaces are subsequently heated to completely condense the prepolymer to obtain an insoluble polymeric coating. In addition, the imide-amine prepolymers may be molded or extruded into various shapes which can be further condensed to obtain thermally-stable articles. Films of the polymers, for example, have been found to have high tensile strengths in addition to their resistance to temperatures above 500° C., e.g., temperatures ranging up to 700° C. For example, a film was made on a Carver Press at 320° C. at 5000 p.s.i.g. This was a strong film which did not melt when heated to 350° C. Likewise, a button of high strength was prepared by molding the polymer in a Carver Press at 320° C. at 10,000 p.s.i.g. This demonstrated that molded articles of high thermal stability may be obtained.

The improved thermal-stability of these polymers is believed to be due primarily to the fused rings which possess a large amount of electron delocalization. It is recognized, for example, that the presence of aliphatic groups in a polymer chain decreases its thermal-stability because of the presence of the aliphatic carbon-to-carbon linkages, whereas in the instant polymers the ladder type structure possesses a large amount of electron delocalization which accounts for outstanding temperature and radiation resistance. While the mechanism of this stability, due to the aromatic ring structure, is not completely understood, it is believed that the electrons which are delocalized among the six carbon atoms of the ring are able to absorb a larger amount of energy without permanent destruction of the bond. The aromatic heterocyclic polymers of this invention contain a substantially higher degree of aromatic character in the main chain and are, therefore, highly stable.

Thus, it is possible in accordance with this invention to provide thermally-stable polymers capable of being formed into fibers, films or molded articles which may be characterized as being able to retain their strength even after extended periods of exposure to elevated temperatures in the presence of air. In preparing fibers, for example, a prepolymer or precursor of the aromatic polymer may be shaped into fibers by any of the known techniques and then heated to generate an intractable polymer in fiber form. Moreover, the polymers of this invention may be spun into continuous filaments and easily drawn over heated rolls at temperatures above the glass transition temperature into extremely strong and highly thermally-stable fibers. In addition, continuous filaments of the polymers may be formed by utilizing common spinning techniques, e.g., sacrificial carrier spinning.

Since it is apparently easier to shape or form a particular article from the imide-amine prepolymer which is soluble in any of a number of organic solvents, e.g., dimethylformamide, it is preferred to form the article or coating from the prepolymer prior to completing the condensation polymerization. In forming the prepolymer into a shaped article or in preparing a coating, solvents may be used in amounts ranging up to about 60% by weight or more. Thus, it is necessary only to provide a composition with sufficient amount of the prepolymer so that it can be shaped into the desired article prior to completing the condensation. The shaped article or polymer coated substrates are then converted by the application of heat to a completely condensed polymer which has at least six fused rings per recurring unit. It is obvious that these coatings may contain other ingredients including, for example, pigments, e.g., titanium dioxide, etc., and may be applied to various substrates including, for example, metal, wood, fibers, wires, glass, fabrics, synthetic materials, paper and the like.

As shown, the aromatic polymers of this invention may be used for a variety of purposes, the most significant of which includes the preparation of films and fibers. These articles would possess outstanding physical properties at room temperature and would be capable of retaining their strength at elevated temperatures ranging up to 700° C. for prolonged periods of time. Because of the outstanding heat-stability, the polymers may be used in various forms for automobile or airplane interiors, decorative trim, electrical and heat insulation, transformers, coils, cable wrappings, coatings and the like. In the fiber form, the polymers may be used in preparing high temperature insulation materials, protective clothing, curtains, packing or bearing materials, brake linings, etc.

While this invention has been described with respect to a number of specific embodiments, it is obvious there are other variations and modifications which may be resorted to without departing from the spirit of the invention except as more particularly pointed out in the appended claims.

We claim:

1. A solid state process of preparing thermally-stable linear polymers consisting essentially of condensing one aromatic dianhydride or the corresponding tetra-acids or tetra lower alkyl esters thereof characterized by the formula

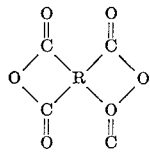

wherein R has at least six carbon atoms characterized by a benzoid unsaturation wherein the four carbonyl groups of the dianhydride are each attached to separate carbon atoms and wherein the carbon atoms of each pair of the carbonyl groups are attached directly to adjacent carbon atoms in a six-membered benzenoid ring of the R group to provide a five-membered ring with an aromatic ortho-tetramino compound selected from the group consisting of tetramino-benzene, tetramino-diphenyl methane, tetramino-diphenyl ethane and tetramino-diphenyl ether in an inert atmosphere at a temperature ranging from about 100 to 200° C. to obtain the prepolymer, heating said prepolymer at a temperature ranging up to about 350° C. to obtain the completely condensed linear polymers.

2. The process of claim 1 further characterized in that the aromatic dianhydride and the tetramino aromatic compound are present during the polymerization in amounts of approximately equal molar ratios.

3. The process of claim 2 further characterized in that the aromatic dianhydride is pyromellitic dianhydride and the aromatic tetramino compound is 3,3′,4,4′-tetraminodiphenyl methane.

4. The process of claim 2 further characterized in that the aromatic dianhydride is pyromellitic dianhydride and the aromatic tetramino compound is 1,2,4,5-tetraminobenzene.

5. The process of claim 2 further charatcerized in that the aromatic dianhydride is pyromellitic dianhydride and the aromatic tetramino compound is 3,3′4,4′-tetraminodiphenyl ether.

6. The process of claim 2 further characterized in that the condensation polymerization takes place in the presence of nitrogen as the inert atmosphere.

7. The process of claim 3 further characterized in that the pyromellitic dianhydride and the tetramino aromatic compounds are condensed at temperatures ranging from about 125° C. to 170° C. for periods ranging up to about three hours to obtain the prepolymer; said prepolymer heated at temperatures ranging up to about 270° C. to obtain the completely condensed linear polymer.

8. The process of claim 7 further characterized in that the aromatic dianhydride is pyromellitic dianhydride and the aromatic tetramino compound is 3,3′4,4′-tetraminodiphenyl methane.

9. The process of claim 7 further characterized in that the aromatic tetramino compound is 1,2,4,5-tetraminobenzene.

References Cited

UNITED STATES PATENTS 3,414,543   12/1968   Paufler _____ 260—47

OTHER REFERENCES

Dawans et al., Polymers From Ortho Aromatic Tetraamines and Aromatic Dianhydrides, Journal of Polymer Science, vol. 3, pp. 3549–3550, 3565–3569, October 1965.

WILLIAM SHORT, Primary Examiner

L. L. LEE, Assistant Examiner

U.S. Cl. X.R.

260—78, 78.4

PO-1050
(5/69)

UNITED STATES PATENT OFFICE
CERTIFICATE OF CORRECTION

Patent No. 3,549,594          Dated December 22, 1970

Inventor(s) Ian C. Twilley and Stanley D. Lazarus

It is certified that error appears in the above-identified patent and that said Letters Patent are hereby corrected as shown below:

Claim 1, column 7, line 47, the formula:

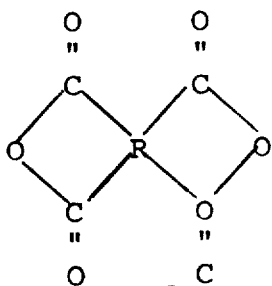

should be changed to:

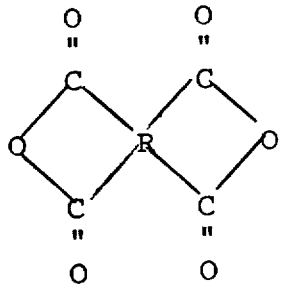

Claim 5, column 8, line 22, "charatcerized" should be "characterized".

Signed and sealed this 23rd day of March 1971.

(SEAL)
Attest:

EDWARD M. FLETCHER, JR.
Attesting Officer

WILLIAM E. SCHUYLER, JR
Commissioner of Patents